US011167269B1

(12) United States Patent
Qi et al.

(10) Patent No.: US 11,167,269 B1
(45) Date of Patent: Nov. 9, 2021

(54) THREE-WAY CATALYST MATERIALS AND APPURTENANT DEVICES AND SYSTEMS

(71) Applicant: GM GLOBAL TECHNOLOGY OPERATIONS LLC, Detroit, MI (US)

(72) Inventors: Gongshin Qi, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/928,093

(22) Filed: Jul. 14, 2020

(51) Int. Cl.
| | |
|---|---|
| *F01N 3/10* | (2006.01) |
| *B01J 23/656* | (2006.01) |
| *B01J 35/00* | (2006.01) |
| *B01J 35/04* | (2006.01) |
| *B01J 21/04* | (2006.01) |
| *B01J 23/10* | (2006.01) |
| *F01N 3/28* | (2006.01) |

(52) U.S. Cl.
CPC ........... *B01J 23/6567* (2013.01); *B01J 21/04* (2013.01); *B01J 23/10* (2013.01); *B01J 35/0006* (2013.01); *B01J 35/0013* (2013.01); *B01J 35/0066* (2013.01); *B01J 35/04* (2013.01); *F01N 3/101* (2013.01); *F01N 3/2839* (2013.01); *F01N 2370/02* (2013.01)

(58) Field of Classification Search
CPC .... F01N 3/101; F01N 3/2839; F01N 2370/02; B01J 23/6567; B01J 21/04; B01J 35/0066
USPC .......................................................... 422/171
See application file for complete search history.

(56) References Cited

U.S. PATENT DOCUMENTS

| | | | | | |
|---|---|---|---|---|---|
| 6,087,298 | A | * | 7/2000 | Sung ................... | B01D 53/9477 502/333 |
| 6,391,822 | B1 | * | 5/2002 | Dou .................... | B01D 53/9422 502/325 |

* cited by examiner

*Primary Examiner* — Tom P Duong
(74) *Attorney, Agent, or Firm* — Harness, Dickey & Pierce, P.L.C.

(57) ABSTRACT

A three-way catalyst device (TWC) includes a first catalytic brick (FCB) and a second catalytic brick (SCB) downstream from the FCB. The FCB has a first washcoat applied to a first support body including ceramic and/or metal oxide particles, Pd particles, and Rh particles, and has at most 35 g/ft$^3$ Pd and at most 7.5 g/ft$^3$ Rh. The SCB has a second washcoat applied to a second support body including ceramic and/or metal oxide particles, Pt particles, and Rh particles, and has a Pt loading of at most 35 g/ft$^3$ Pt and a Rh loading of at most 7.0 g/ft$^3$ Rh. The FCB can have 25 g/ft$^3$ to 35 g/ft$^3$ Pd and 5.5 g/ft$^3$ to 7.5 g/ft$^3$ Rh and the SCB can have 25 g/ft$^3$ to 35 g/ft$^3$ Pt and 5.0 g/ft$^3$ to 7.0 g/ft$^3$ Rh. The TWC can receive exhaust gas from an internal combustion engine powering a vehicle.

19 Claims, 4 Drawing Sheets

THREE-WAY CATALYST MATERIALS AND APPURTENANT DEVICES AND SYSTEMS

INTRODUCTION

Platinum group metal (PGM) catalysts, particularly those including rhodium, platinum, and palladium, catalysts are commonly used in gasoline and diesel automotive emissions aftertreatment systems to convert (e.g., oxidize, reduce) various constituents of exhaust gas, such as carbon monoxide (CO), unburned and partially-burned hydrocarbons (HC), and nitrogen oxides. Such catalysts typically comprise a bi-metallic and tri-metallic alloys (e.g., Pt—Pd, Pt—Rh, and Pt—Pd—Rh alloys) disposed on high surface area supports (e.g., alumina, zirconia, ceria).

SUMMARY

Provided are three-way catalyst devices (TWC) including a canister having an inlet and an outlet defining an exhaust gas flow path, a first catalytic brick disposed downstream from the canister inlet within the canister and a second catalytic brick disposed downstream from the first catalytic brick within the canister. The first catalytic brick can include a first washcoat applied to a first support body including ceramic and/or metal oxide particles, Pd particles, and Rh particles, and have a Pd loading of at most 35 $g/ft^3$ and a Rh loading of at most 7.5 $g/ft^3$. The second catalytic brick can include a second washcoat applied to a second support body including ceramic and/or metal oxide particles, Pt particles, and Rh particles, and can have a Pt loading of at most 35 $g/ft^3$ and a Rh loading of at most 7.0 $g/ft^3$ Rh. The first catalytic brick can have a Pd loading of about 25 $g/ft^3$ to about 35 $g/ft^3$ and a Rh loading of about 5.5 $g/ft^3$ to about 7.5 $g/ft^3$ and the second catalytic brick can have a Pt loading of about 25 $g/ft^3$ to about 35 $g/ft^3$ and a Rh loading of about 5.0 $g/ft^3$ to about 7.0 $g/ft^3$. The first catalytic brick can have a Pd loading of about 29 $g/ft^3$ to about 31 $g/ft^3$ and a Rh loading of about 6.25 $g/ft^3$ to about 6.75 $g/ft^3$ and the second catalytic brick can have a Pt loading of about 29 $g/ft^3$ to about 31 $g/ft^3$ and a Rh loading of about 5.75 $g/ft^3$ to about 6.25 $g/ft^3$. The first support body and the second support body can be a common monolith. The Pd particles in the first washcoat can have an average particle size of about 3 nm to about 30 nm and the Rh particles in the first washcoat can have an average particle size of about 5 nm to about 30 nm. The Pt particles in the second washcoat can have an average particle size of about 3 nm to about 15 nm and the Rh particles in the second washcoat can have an average particle size of about 5 nm to about 30 nm. The first catalytic brick and the second catalytic brick can be discrete, contiguous bodies. The ceramic and/or metal oxide particles of one or more of the first washcoat and the second washcoat can include alumina, silica, ceria, zirconia, titania, lanthana, zeolite, and combinations thereof. The second catalytic brick can have less than 1 $g/ft^3$ of Pd. The second catalytic brick can have a volume of about 50% to about 150% the volume of the first catalytic brick.

Exhaust gas treatment system are provided and can include an internal combustion engine configured to power a vehicle which supplies an exhaust gas stream to a three-way catalyst device (TWC) through an exhaust gas conduit. The TWC can include a canister having an inlet and an outlet defining an exhaust gas flow path, a first catalytic brick disposed downstream from the canister inlet within the canister and a second catalytic brick disposed downstream from the first catalytic brick within the canister. The first catalytic brick can include a first washcoat applied to a first support body including ceramic and/or metal oxide particles, Pd particles, and Rh particles, and have a Pd loading of at most 35 $g/ft^3$ and a Rh loading of at most 7.5 $g/ft^3$. The second catalytic brick can include a second washcoat applied to a second support body including ceramic and/or metal oxide particles, Pt particles, and Rh particles, and can have a Pt loading of at most 35 $g/ft^3$ and a Rh loading of at most 7.0 $g/ft^3$ Rh. The first catalytic brick can have a Pd loading of about 25 $g/ft^3$ to about 35 $g/ft^3$ and a Rh loading of about 5.51 $g/ft^3$ to about 7.51 $g/ft^3$ and the second catalytic brick can have a Pt loading of about 25 $g/ft^3$ to about 35 $g/ft^3$ and a Rh loading of about 5.0 $g/ft^3$ to about 7.0 $g/ft^3$. The first catalytic brick can have a Pd loading of about 29 $g/ft^3$ to about 31 $g/ft^3$ and a Rh loading of about 6.25 $g/ft^3$ to about 6.75 $g/ft^3$ and the second catalytic brick can have a Pt loading of about 29 $g/ft^3$ to about 31 $g/ft^3$ and a Rh loading of about 5.75 $g/ft^3$ to about 6.25 $g/ft^3$. The first support body and the second support body can be a common monolith. One or more of the first support body and the second support body can include cordierite. The first catalytic brick and the second catalytic brick can be discrete, contiguous bodies. The ceramic and/or metal oxide particles of one or more of the first washcoat and the second washcoat can include alumina, silica, ceria, zirconia, titania, lanthana, zeolite, and combinations thereof. The second catalytic brick can have less than 1 $g/ft^3$ of Pd. The second catalytic brick can have a volume of about 50% to about 150% the volume of the first catalytic brick. The TWC can be close-coupled to the internal combustion engine.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are catalyst materials and appurtenant devices which exhibit high catalytic activity and efficient usage of catalytic metals. In particular, three-way catalyst devices (TWC) exhibiting high exhaust gas conversion performance are provided.

Figure 1:
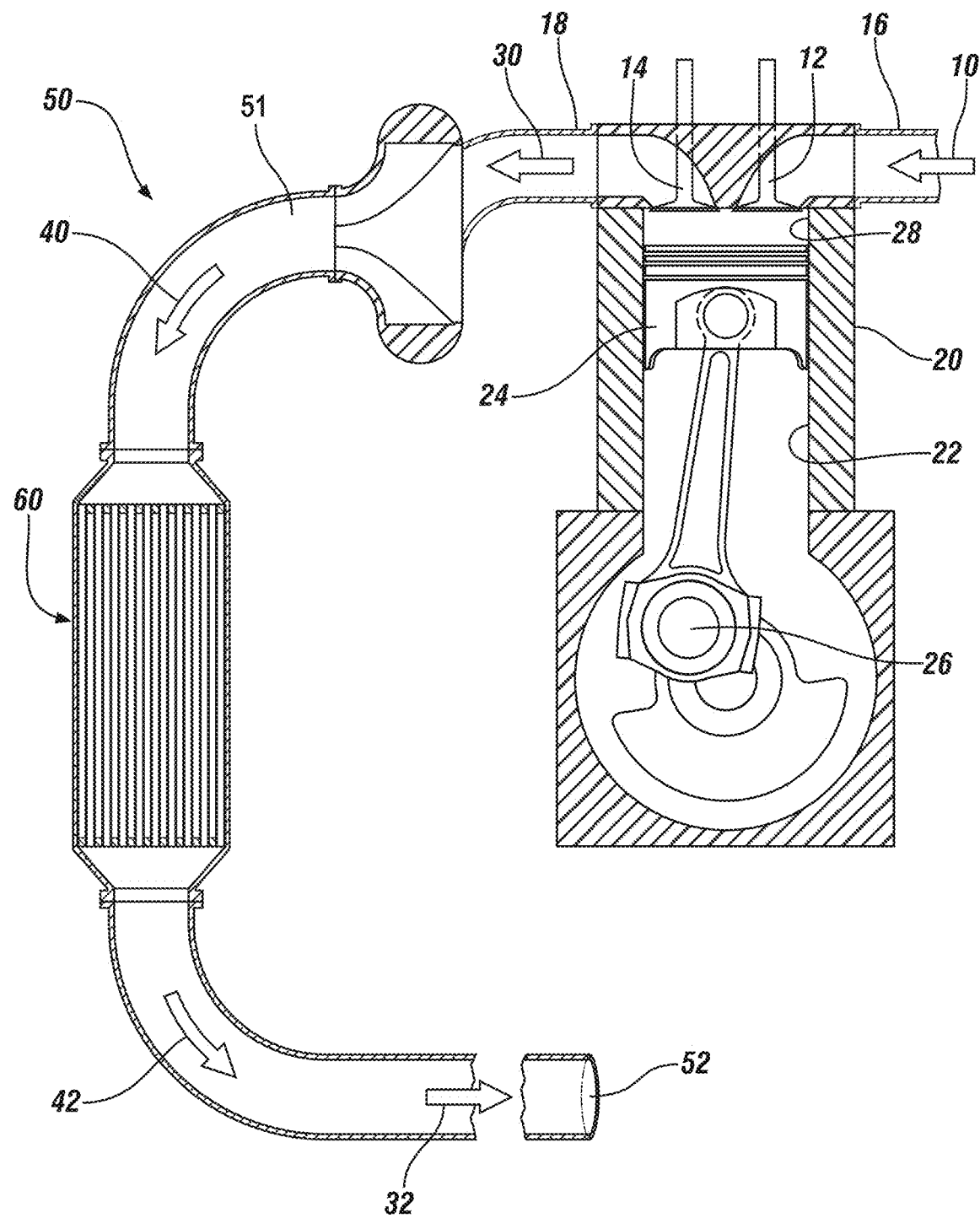
FIG. 1 illustrates an exhaust gas treatment system appurtenant to an internal combustion engine, according to one or more embodiments.

FIG. 1 illustrates a TWC 60 appurtenant to exhaust gas treatment system 50. System 50 is configured to receive and treat exhaust gas 30 generated by internal combustion engine (ICE) 20. Exhaust gas 30 can be communicated from an exhaust manifold 18 of the ICE 20 to the TWC 60 by a conduit 51, for example. TWC 60 can include close-coupled TWCs, underfloor TWCs, and others as will be known by those of skill in the art. A close-coupled TWC 60 has at most about 5 inches, at most about 3 inches, or at most about 2 inches of conduit connecting the canister 62 inlet 64 to the exhaust manifold 18, for example.

A mixture of air and fuel 10 enters ICE 20 and exits as an exhaust gas 30. The exhaust gas stream 40 then passes through the exhaust gas treatment system 50. In general, TWC 60 is configured to oxidize carbon monoxide (CO) and hydrocarbons (HC) present in exhaust gas 30 into carbon dioxide ($CO_2$) and water, and additionally reduce one or more nitrogen oxide (NOx) species present in exhaust gas. As used herein, "$NO_x$" refers to one or more nitrogen oxides. $NO_x$ species can include $N_yO_x$ species, wherein y>0 and x>0. Non-limiting examples of nitrogen oxides can include $NO$, $NO_2$, $N_2O$, $N_2O_2$, $N_2O_3$, $N_2O_4$, and $N_2O_5$.

ICE 20 can be configured to power a vehicle (not shown). The multi-cylinder, reciprocating piston ICE 20 may be a spark ignition direct injection ICE (i.e., gasoline ICE, which may or may not contain an in-cylinder fuel injector), or a homogeneous charge compression ignition ICE. Each of these types of ICEs includes one or more cylinders 22 that accommodate reciprocating piston heads 24 connected to a crankshaft 26. Located above each piston head 24 is a combustion chamber 28 that receives a mixture of air and fuel 10 through an intake valve 12 at specifically timed intervals. The ignition of the air and fuel mixture 10 in the combustion chambers 28 invokes rapid downward linear movement of their respective piston heads 24 to drive rotation of the crankshaft 26. The reactive upward movement of each piston head 24 expels the combustion products from each combustion chamber 28 through an exhaust valve 14.

ICE 20 is supplied with a continuous air flow at a variable mass flow rate responsive to ICE performance demands (e.g., pressing and depressing a foot pedal located in the driver-side compartment to achieve desired vehicle speed and acceleration). A desired quantity of fuel is intermittently injected into an incoming air flow just upstream from the ICE 20, as dictated, for example, by an ICE control strategy, to produce a mixture of air and fuel that exhibits the instantly desired air to fuel mass ratio (not shown). For example, the quantity of fuel injected into the incoming air flow can be controlled to maintain a lean air to fuel mass ratio or a rich air to fuel mass ratio, or to switch between the two states.

The mixture of air and fuel 10 enters an intake manifold 16 of the ICE 20 and exits as an exhaust gas 30 through the exhaust manifold 18. The intake manifold 16 delivers the air and fuel mixture 10 into the combustion chambers 28 through the intake valve 12 and then to the cylinders 22 of the ICE 20. The air and fuel mixture 10 is compressed, heated, and thereby ignited to power the reciprocating piston heads 24 in the cylinders 22 of the ICE 20. The spent combustion products are expelled from the cylinders 22 of the ICE 20 by the exhaust strokes of the pistons 24 and into the exhaust manifold 18 through the exhaust valve 14. The exhaust manifold 18 delivers the combustion products to the exhaust gas treatment system 50 as the exhaust gas 30. The treatment system 50 communicates the exhaust gas 30 to TWC 60 for the effective conversion of exhaust gas 30 constituents (e.g., CO, HC, and NOx).

Figure 2:
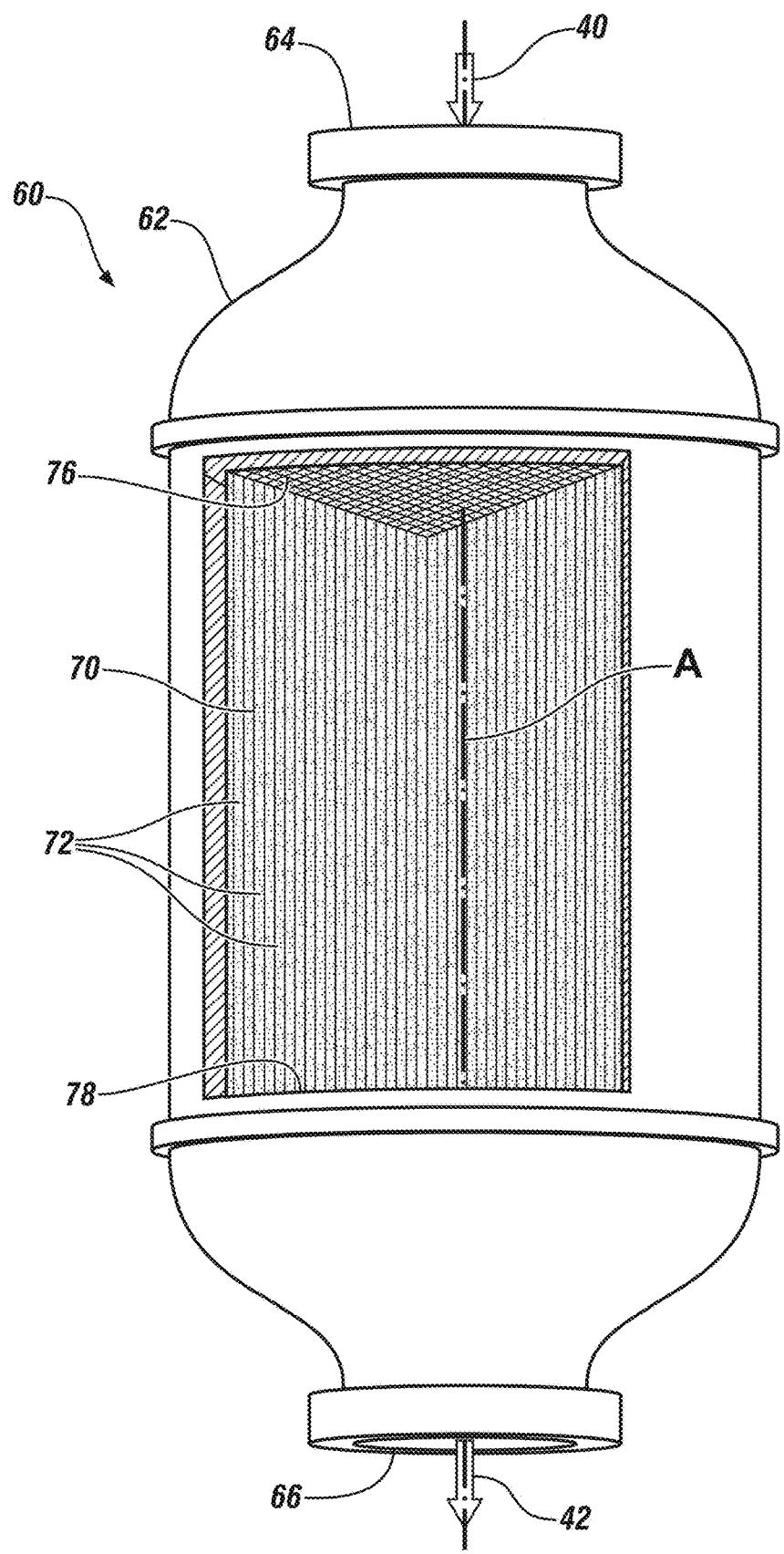
FIG. 2 illustrates a three-way catalyst device, according to one or more embodiments.
Figure 3:
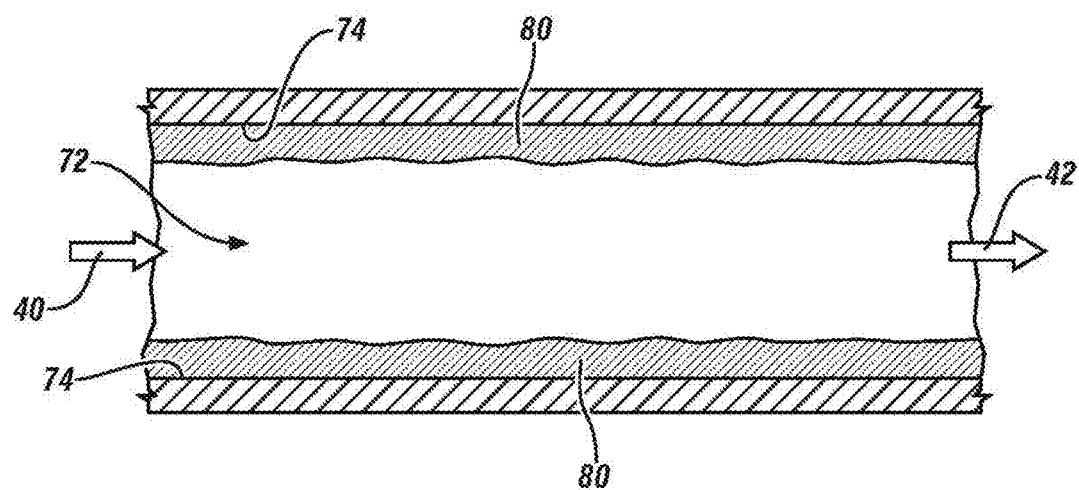
FIG. 3 illustrates a cross sectional view of a three-way catalyst device, according to one or more embodiments.

As shown in FIGS. 1-3, the exhaust gas stream 40 enters TWC 60 and passes through the support body 70, which can comprise flow-through channels 72, for example, defined by walls 74. TWC 60 comprises catalyst material disposed on the support body 70 as a washcoat 80. The support body 70 generally comprises a catalytically inert frame or substrate (e.g., a cordierite frame), or other materials known in the art suitable for accepting washcoat 80. Washcoat 80 comprises particles of porous, non-metal (i.e., a material which is not an elemental metal or metal alloy) materials, such as a metal oxide or ceramic material. In some embodiments, washcoat 80 comprises one or more of alumina, silica, ceria, zirconia, titania, lanthana, and zeolite. In some embodiments, one or more of alumina, silica, ceria, zirconia, titania, lanthana, and zeolite can be doped with La and Nd. Washcoat 80 further comprises one or more catalytically active particles such as particles of platinum group metals (PGM), as will be described below. The high-surface area of the channel walls 74 creates sufficient contact between the exhaust gas 30 and the catalyst material for the desired oxidation and reduction reactions to occur. The exhaust gas treatment system 50 then communicates the exhaust gas stream 40 from TWC 60 as a treated exhaust gas stream 42. The treated exhaust gas 32 is expelled from the treatment system 50 through a vent 52 (e.g., a vehicle tail pipe), for example to the ambient atmosphere.

A suitable TWC 60 for the catalyzed reactions disclosed herein is shown in FIG. 2 and is piped within the exhaust gas treatment system 50 to facilitate continuous passage of the exhaust gas stream 40 therethrough. TWC 60 can further include a shell or canister 62 comprising a substantially inert material, relative to the exhaust gas constituents, such as stainless steel or other metal alloys. Canister 62 is shaped with an upstream inlet 64 for exhaust gas 30 entry, and a downstream outlet 66 for exhaust gas 30 expulsion. The body of the canister 62 can be round or elliptical in cross-section, although other configurations are practicable, and sized to hold a support body 70 to which catalyst material is applied. In FIG. 2, a wedge portion of the canister 62 and the support body 70 have been cut-away to better reveal the internal channels 72 extending therethrough.

The support body 70 is shown in FIG. 2 as a honeycomb-shaped monolith with an inlet face 76 and an outlet face 78 transverse to the exhaust gas stream 40 (that is, along the flow axis A), and includes several small, square, parallel flow-through channels 72 defined by walls 74 which extending longitudinally from the inlet face 76 to the outlet face 78 of the support body. Since each channel 72 is small in cross-section for admitting the exhaust gas stream 40, the inlet face 76 of the support body is sized to provide a suitable number of channels 72 to collectively accommodate a desired flow rate for the exhaust gas stream 40. For example, the support body 70 may contain about 400 to 900 channels 72 per square inch of inlet face 76 cross-sectional area.

While extruded ceramic, honeycomb-shaped monoliths have proven effective and durable for catalysts, other catalyst support bodies of different materials and geometric configurations may be used and are germane to the embodiments herein.

Figure 4:
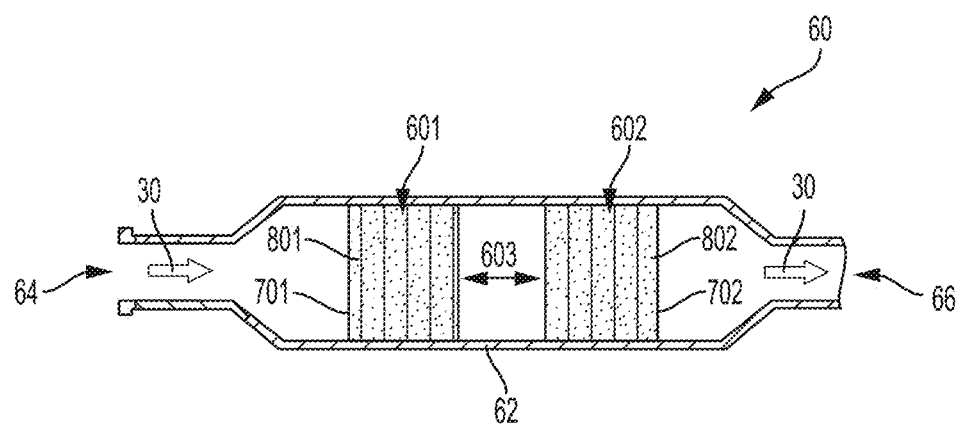
FIG. 4 illustrates a cross sectional schematic view of a three-way catalyst, according to one or more embodiments.

As described above, and as shown in FIG. 3, a washcoat 80 is applied to the walls 74 of the flow-through channels 72 of support body 70. In general, TWCs, such as TWC 60, promote oxidation and reduction of target species (e.g., CO, HC, NOx), for example between catalytic metals (e.g., Pt, Pd, Rh) present in a washcoat 80. FIG. 4 illustrates a cross sectional schematic view of a TWC 60 comprising a canister 62 having an inlet 64 and an outlet 64 defining an exhaust gas 30 flow path, a first catalytic brick 601 disposed downstream from the canister inlet 64 within the canister 62, and a second catalytic brick 602 disposed downstream from the first catalytic brick 601 within the canister 62. In some embodiments TWC 60 is configured such that no catalytic bricks are disposed upstream from first catalytic brick 601. Similarly, in some such embodiments, TWC 60 is configured such that no catalytic bricks are disposed between first catalytic brick 601 and second catalytic brick 602.

The first catalytic brick 601 comprises a first washcoat 801 applied to a first support body 701. The first wash coat 701 comprises ceramic and/or metal oxide particles as described above, and additionally Pd particles and Rh particles. In some embodiments, the catalytic loading of first catalytic brick 601 is at most 35 g/ft$^3$ Pd and at most 7.5 g/ft$^3$ Rh. In some embodiments, the catalytic loading of first catalytic brick 601 is about 25 g/ft$^3$ Pd to about 35 g/ft$^3$ Pd and about 5.5 g/ft$^3$ Rh to about 7.5 g/ft$^3$ Rh, about 27.5 g/ft$^3$ Pd to about 32.5 g/ft$^3$ Pd and about 6.0 g/ft$^3$ Rh to about 7.0 g/ft$^3$ Rh, about 29 g/ft$^3$ Pd to about 31 g/ft$^3$ Pd and about 6.25 g/ft$^3$ Rh to about 6.75 g/ft$^3$ Rh, or about 30 g/ft$^3$ Pd and about 6.5 g/ft$^3$ Rh. In some embodiments, the Pd particles in the first washcoat 801 have an average particle size of about 3 nm to about 30 nm, about 4 nm to about 20 nm, or about 5 nm to about 10 nm, and the Rh particles in the first washcoat 801 have an average particle size of about 5 nm to about 30 nm, about 7 nm to about 23 nm, or about 10 nm to about 15 nm.

The second catalytic brick 602 comprises a second washcoat 802 applied to a second support body 702. The second wash coat 702 comprises ceramic and/or metal oxide particles as described above, and additionally Pt particles and Rh particles. In some embodiments, the catalytic loading of second catalytic brick 602 is at most 35 g/ft$^3$ Pt and at most 7.0 g/ft$^3$ Rh. In some embodiments, the catalytic loading of second catalytic brick 602 is about 25 g/ft$^3$ Pt to about 35 g/ft$^3$ Pt and about 5.0 g/ft$^3$ Rh to about 7.0 g/ft$^3$ Rh, about 27.5 g/ft$^3$ Pt to about 32.5 g/ft$^3$ Pt and about 5.5 g/ft$^3$ Rh to about 6.5 g/ft$^3$ Rh, about 29 g/ft$^3$ Pt to about 31 g/ft$^3$ Pt and about 5.75 g/ft$^3$ Rh to about 6.25 g/ft$^3$ Rh, or about 30 g/ft$^3$ Pt and about 6 g/ft$^3$ Rh. TWC 60 advantageously utilizes Pt in the second catalytic brick 702 in place of Pd, as is commonly used by those of skill in the art. Specifically, the second catalytic brick 702 comprises less than 1 g/ft$^3$ of Pd, less than 0.1 g/ft$^3$ of Pd, or less than 0.01 g/ft$^3$ of Pd. In some embodiments, the Pt particles in the second washcoat 802 have an average particle size of about 3 nm to about 15 nm, about 4 nm to about 13 nm, or about 5 nm to about 10 nm, and the Rh particles in the second washcoat 802 have an average particle size of about 5 nm to about 30 nm, about 7 nm to about 23 nm, or about 10 nm to about 15 nm.

FIG. 4 depicts a gap 603 between the first catalytic brick 601 and the second catalytic brick 602; in some such embodiments the gap 603 can comprise at most 3 inches, at most 2 inches, or at most 1 inch. In other embodiments, the first catalytic brick 601 and second catalytic brick 602 are discrete but contiguous bodies. In other embodiments, the first support body 701 and the second support body 702 are a common monolith. The first catalytic brick 601 and second catalytic brick 602 can generally comprise similar volumes. For example, in some embodiments the second catalytic brick 602 has a volume of about 50% to about 150%, or about 90% to about 110% the volume of the first catalytic brick 601.

Example 1

A first conventional TWC and a second TWC comprising catalyst material conforming the embodiments disclosed herein were aged and exposed to exhaust gas streams to determine the catalytic performance of each TWC. The first TWC was a conventional, baseline Pd/Rh TWC and comprised a first catalytic brick and a second catalytic brick disposed downstream from the first catalytic brick. Each brick included a catalytic washcoat applied to the walls of a cordierite substrate with 750 cells/in$^2$. The first brick was zone-coated with an upstream washcoat comprising $Al_2O_3$-based material supported Pd, and $CeO_2$—$ZrO_2$ mixed oxide and/or alumina supported Rh to achieve a catalytic loading of 90.9 g/ft3 Pd and 4.51 g/ft3 Rh, and a downstream washcoat comprising $Al_2O_3$-based material supported Pd, and $CeO_2$—$ZrO_2$ mixed oxide and/or alumina supported Rh to achieve a catalytic loading of 30.3 g/ft$^3$ Pd, 8.5 g/ft$^3$ Rh. The second catalytic brick was washcoated with $Al_2O_3$-based material supported Pd, and $CeO_2$—$ZrO_2$ mixed oxide and/or alumina supported Rh to achieve a catalytic loading of 30 g/ft$^3$ Pd and 6.5 g/ft$^3$ Rh.

The second TWC comprised a first catalytic brick and a second catalytic brick disposed downstream from the first catalytic brick. Each brick included a catalytic washcoat applied to the walls of a cordierite substrate with 750 cells/in$^2$. The first brick was washcoated with an $Al_2O_3$-based material supported Pd, and $CeO_2$—$ZrO_2$ mixed oxide and/or alumina supported Rh to achieve a catalytic loading of 30 g/ft3 Pd and 6.5 g/ft3 Rh, and a downstream washcoat comprising $Al_2O_3$ and/or $CeO_2$—$ZrO_2$-based material supported Pd, and $CeO_2$—$ZrO_2$ mixed oxide and/or alumina supported Rh to achieve a catalytic loading of 30 g/ft$^3$ Pt, 6 g/ft$^3$ Rh.

Figure 5A:
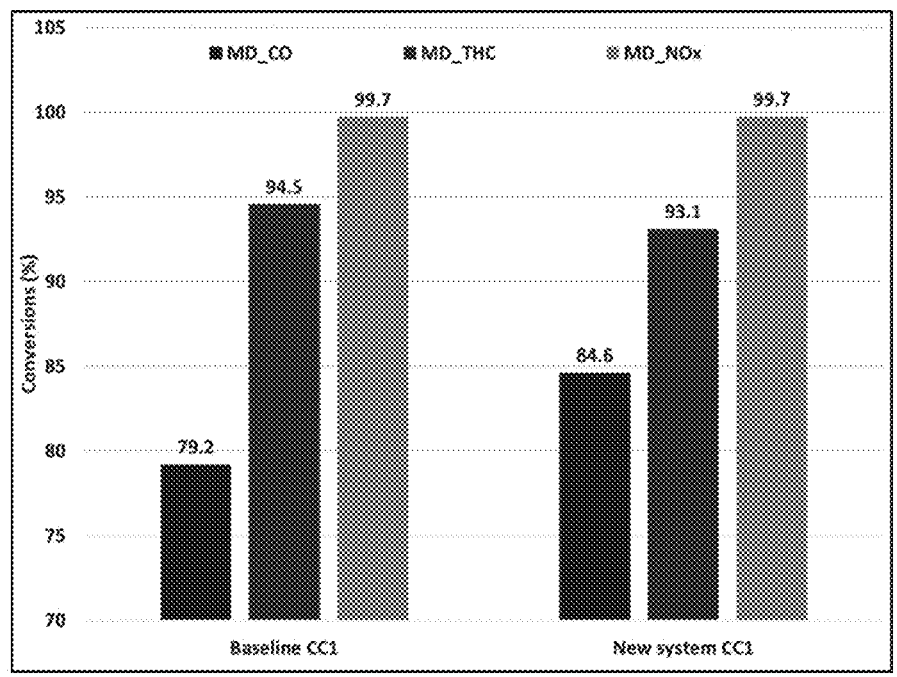
FIG. 5A illustrates exhaust gas conversion data for two three-way catalyst devices, according to one or more embodiments.
Figure 5B:
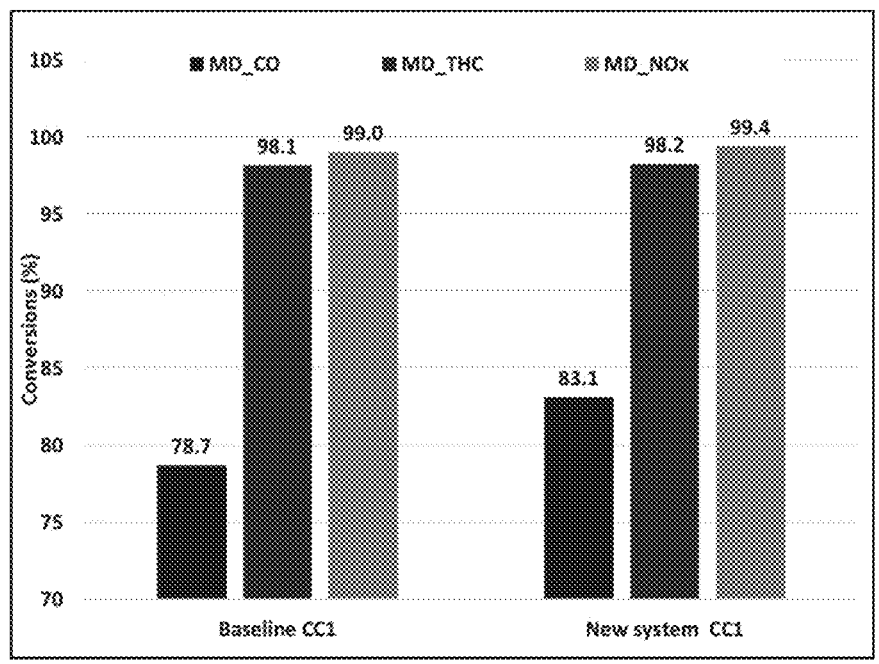
FIG. 5B illustrates exhaust gas conversion for two three-way catalyst devices, according to one or more embodiments.

The first conventional TWC included 3.20 g of Pd and 0.46 g of Rh. The second TWC included 1.06 g of Pd, 1.06 g of Pt, and 0.46 g of Rh. Each TWC was aged at 1050 C for 50 hours before being exposed to an exhaust gas stream under two conditions. FIG. 5A illustrates the conversion performance of each TWC under FTP 72 conditions. FIG. 5B illustrates the conversion performance of each TWC under US06 conditions. It can be seen that the second TWC ("New system CC1") performs the same or better than the first TWC ("Baseline CC1") in almost all conversion categories.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A three-way catalyst device (TWC) comprising:
   a canister having an inlet and an outlet defining an exhaust gas flow path;
   a first catalytic brick disposed downstream from the canister inlet within the canister and comprising a first washcoat applied to a first support body, wherein the first wash coat comprises ceramic and/or metal oxide particles, Pd particles, and Rh particles, and wherein the first catalytic brick has a Pd loading of at most 35 g/ft$^3$ and a Rh loading of at most 7.5 g/ft$^3$, wherein the Pd particles in the first washcoat have an average particle size of about 3 nm to about 30 nm and the Rh particles in the first washcoat have an average particle size of about 5 nm to about 30 nm; and
   a second catalytic brick disposed downstream from the first catalytic brick within the canister and comprising a second washcoat applied to a second support body, wherein the second wash coat comprises ceramic and/or metal oxide particles, Pt particles, and Rh particles, and wherein the second catalytic brick has a Pt loading of at most 35 g/ft$^3$ and a Rh loading of at most −7.0 g/ft$^3$.

2. The TWC of claim 1, wherein the first catalytic brick has a Pd loading of about 25 g/ft$^3$ to about 35 g/ft$^3$ and a Rh loading of about 5.5 g/ft$^3$ to about 7.5 g/ft$^3$ and the second catalytic brick has a Pt loading of about 25 g/ft$^3$ to about 35 g/ft$^3$ and a Rh loading of about 5.0 g/ft$^3$ to about 7.0 g/ft$^3$.

3. The TWC of claim 1, wherein the first catalytic brick has a Pd loading of about 29 g/ft$^3$ to about 31 g/ft$^3$ and a Rh loading of about 6.25 g/ft$^3$ to about 6.75 g/ft$^3$ and the second catalytic brick has a Pt loading of about 29 g/ft$^3$ to about 31 g/ft$^3$ and a Rh loading of about 5.75 g/ft$^3$ to about 6.25 g/ft$^3$.

4. The TWC of claim 1, wherein the first support body and the second support body are a common monolith.

5. The TWC of claim 1, wherein the Pt particles in the second washcoat have an average particle size of about 3 nm to about 15 nm and the Rh particles in the second washcoat have an average particle size of about 5 nm to about 30 nm.

6. The TWC of claim 1, wherein the first catalytic brick and the second catalytic brick are discrete, contiguous bodies.

7. The TWC of claim 1, wherein the ceramic and/or metal oxide particles of one or more of the first washcoat and the second washcoat comprise alumina, silica, ceria, zirconia, titania, lanthana, zeolite, and combinations thereof.

8. The TWC of claim 1, wherein the second catalytic brick comprises less than 1 g/ft$^3$ of Pd.

9. The TWC of claim 1, wherein the second catalytic brick has a volume of about 50% to about 150% the volume of the first catalytic brick.

10. An exhaust gas treatment system comprising:
    an internal combustion engine configured to power a vehicle which supplies an exhaust gas stream to a three-way catalyst device (TWC) through an exhaust gas conduit,
    wherein the TWC comprises:
    a canister having an inlet and an outlet defining an exhaust gas flow path, wherein the inlet is configured to receive exhaust gas from the exhaust gas conduit;
    a first catalytic brick disposed downstream from the canister inlet within the canister and comprising a first washcoat applied to a first support body, wherein the first wash coat comprises ceramic and/or metal oxide particles, Pd particles, and Rh particles, and wherein the first catalytic brick has a Pd loading of at most 35 g/ft$^3$ and a Rh loading of at most 7.51 g/ft$^3$, wherein the Pd particles in the first washcoat have an average particle size of about 3 nm to about 30 nm and the Rh particles in the first washcoat have an average particle size of about 5 nm to about 30 nm; and
    a second catalytic brick disposed downstream from the first catalytic brick within the canister and comprising a second washcoat applied to a second support body, wherein the second wash coat comprises ceramic and/or metal oxide particles, Pt particles, and Rh particles, and wherein the second catalytic brick has a Pt loading of at most 35 g/ft$^3$ and a Rh loading of at most −7.0 g/ft$^3$.

11. The exhaust gas treatment system of claim 10, wherein the first catalytic brick has a Pd loading of about 25 g/ft$^3$ to about 35 g/ft$^3$ and a Rh loading of about 5.51 g/ft$^3$ to about 7.51 g/ft$^3$ and the second catalytic brick has a Pt loading of about 25 g/ft$^3$ to about 35 g/ft$^3$ and a Rh loading of about 5.0 g/ft$^3$ to about 7.0 g/ft$^3$.

12. The exhaust gas treatment system of claim 10, wherein the first catalytic brick has a Pd loading of about 29 g/ft$^3$ to about 31 g/ft$^3$ and a Rh loading of about 6.25 g/ft$^3$ to about 6.75 g/ft$^3$ and the second catalytic brick has a Pt loading of about 29 g/ft$^3$ to about 31 g/ft$^3$ and a Rh loading of about 5.75 g/ft$^3$ to about 6.25 g/ft$^3$.

13. The exhaust gas treatment system of claim 10, wherein the first support body and the second support body are a common monolith.

14. The exhaust gas treatment system of claim 10, wherein one or more of the first support body and the second support body comprise cordierite.

15. The exhaust gas treatment system of claim 10, wherein the first catalytic brick and the second catalytic brick are discrete, contiguous bodies.

16. The exhaust gas treatment system of claim 10, wherein the ceramic and/or metal oxide particles of one or more of the first washcoat and the second washcoat comprise alumina, silica, ceria, zirconia, titania, lanthana, zeolite, and combinations thereof.

17. The exhaust gas treatment system of claim 10, wherein the second catalytic brick comprises less than 1 g/ft$^3$ of Pd.

18. The exhaust gas treatment system of claim 10, wherein the second catalytic brick has a volume of about 50% to about 150% the volume of the first catalytic brick.

19. The exhaust gas treatment system of claim 10, wherein the TWC is close-coupled to the internal combustion engine.

* * * * *